United States Patent [19]
Naoi et al.

[11] Patent Number: 5,417,267
[45] Date of Patent: May 23, 1995

[54] PNEUMATIC TIRES INCLUDING FOAMED RUBBER LAYER TO REDUCE NOISE

[75] Inventors: Toshikatsu Naoi; Seiichiro Tokunaga, both of Kodaira, Japan

[73] Assignee: Bridgestone Corporation, Tokyo, Japan

[21] Appl. No.: 932,583

[22] Filed: Aug. 20, 1992

[30] Foreign Application Priority Data

Aug. 20, 1991 [JP] Japan .................. 3-231048

[51] Int. Cl.⁶ .................. B60C 9/18; B60C 11/00
[52] U.S. Cl. .................. 152/209 R; 152/532
[58] Field of Search ........... 152/532, 526, 555, 209 R

[56] References Cited

U.S. PATENT DOCUMENTS

| | | | |
|---|---|---|---|
| 3,486,545 | 12/1969 | Niclas et al. | 152/155 |
| 4,349,061 | 9/1982 | Hirakawa et al. | 152/532 |
| 4,373,566 | 2/1983 | Hirakawa et al. | 152/532 |
| 5,109,902 | 5/1992 | Kobayashi | 152/532 |

FOREIGN PATENT DOCUMENTS

| | | | |
|---|---|---|---|
| 0280442 | 8/1988 | European Pat. Off. | 52/532 |
| 0370724 | 5/1990 | European Pat. Off. | B60C 9/18 |
| 1533245 | 3/1967 | France | B60C 9/18 |
| 1016583 | 11/1955 | Germany . | |
| 2946273 | 5/1981 | Germany | 152/450 |
| 3045765 | 6/1981 | Germany | 152/532 |
| 0015203 | 1/1985 | Japan | 152/532 |
| 028300 | 12/1987 | Japan | 152/209 R |
| 1078902 | 3/1989 | Japan | 152/450 |
| 2-225106 | 9/1990 | Japan | B60C 11/00 |
| 753963 | 8/1956 | United Kingdom . | |
| 1067856 | 5/1967 | United Kingdom | 152/532 |

*Primary Examiner*—Geoffrey L. Knable
*Attorney, Agent, or Firm*—Sughrue, Mion, Zinn, Macpeak & Seas

[57] ABSTRACT

A pneumatic tire comprises a carcass of at least one carcass ply, a belt comprised of at least three belt layers, and a tread provided with plural circumferential grooves and island portions defined by these circumferential grooves, in which the tread is comprised of at least two rubber layers, one of which layers being a foamed rubber layer not exposed at a side of ground contact surface of the tire. In this case, the foamed rubber layer is extended up to a buttress portion of the tire, whereby noises produced during the running of the tire are effectively reduced without the degradation of wear resistance.

9 Claims, 6 Drawing Sheets

FIG_1

FIG_2

FIG_3

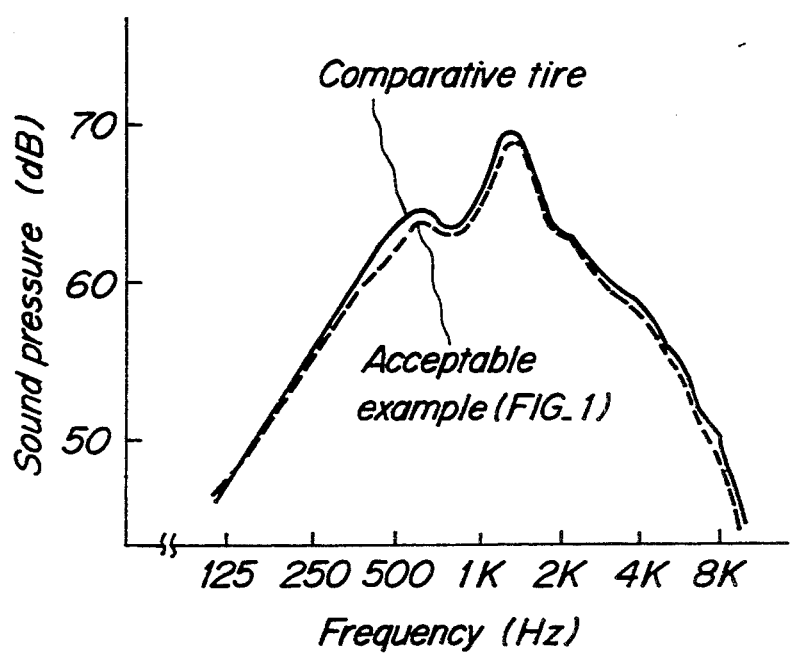
FIG_6

PNEUMATIC TIRES INCLUDING FOAMED RUBBER LAYER TO REDUCE NOISE

BACKGROUND OF THE INVENTION

1. Field of the Invention

This invention relates to a pneumatic tire, and more particularly to a pneumatic tire which can effectively reduce noise produced during the running of the tire without degrading wear resistance.

2. Description of the Related Art

As a means for reducing noises in a pneumatic tire produced during the running of the tire, it have hitherto various tread pattern designs have been attempted and the like with attention to a portion of the tire directly contacting with ground. Lately, however, it has been confirmed that resonance sound resulting from vibration of a sidewall portion becomes a large factor as noise of the tire in addition to sound generated in the ground contact portion.

SUMMARY OF THE INVENTION

It is, therefore, an object of the invention to particularly reduce the resonance sound in the sidewall portion of the tire without degrading the wear resistance of the tire.

According to the invention, there is the provision of a pneumatic tire comprising a carcass of at least one carcass ply extending between a pair of bead cores, a belt superimposed around a crown portion of the carcass outward in a radial direction of the tire and comprised of at least three belt layers, and a tread arranged on the belt outward in the radial direction and provided with plural circumferential grooves and island portions defined by these circumferential grooves, said tread being comprised of at least two rubber layers, one of which layers being a foamed rubber layer not exposed at a side of ground contact surface of the tire, said foamed rubber layer being extended up to a buttress portion of the tire.

In the preferred embodiments of the invention, the foamed rubber layer is arranged in a zone located at a position corresponding to not more than 50% of a groove depth of the circumferential groove toward the belt, particularly in a zone ranging from a shoulder portion of the tire to buttress portion thereof, and also the foamed rubber has an expansion ratio of 5–50%.

BRIEF DESCRIPTION OF THE DRAWINGS

The invention will be described with reference to the accompanying drawings, wherein:

FIG. 6 is a graph showing a relation between sound pressure and frequency.

DESCRIPTION OF THE PREFERRED EMBODIMENTS

Figure 1:
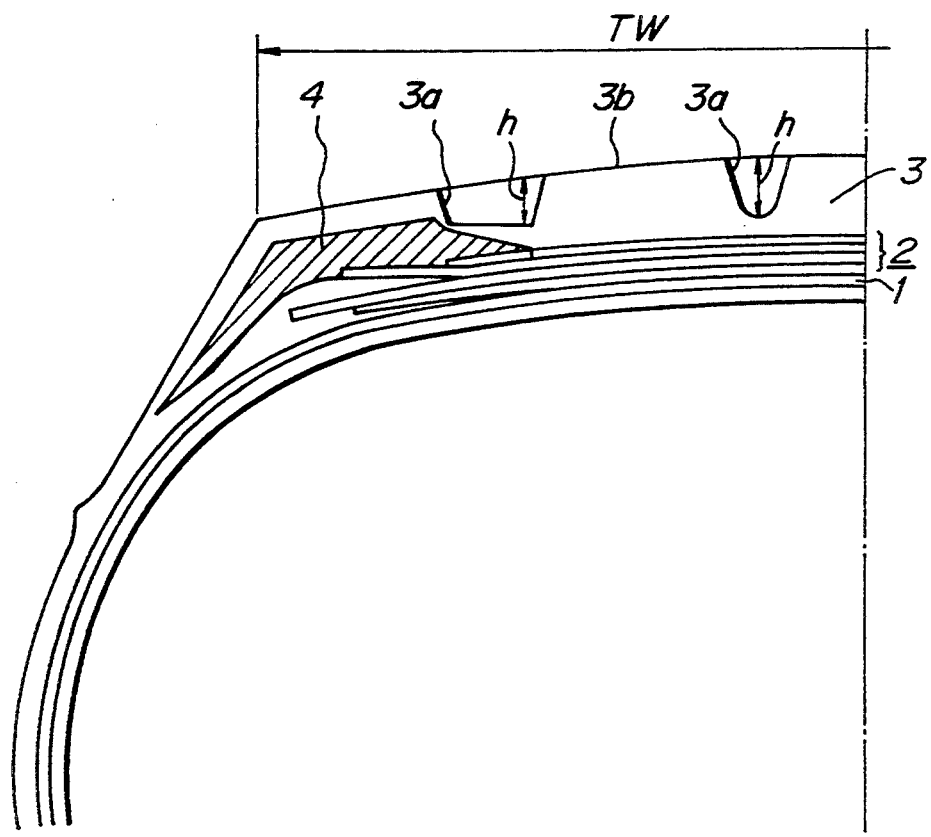
FIG. 1 is a diagrammatically left-half sectional view of a first embodiment of the pneumatic tire according to the invention.

FIG. 1 shows a left-half section of main part of a first embodiment of the pneumatic tire having a tread width TW according to the invention. Numeral 1 is a carcass of at least one carcass ply extending between a pair of bead cores (not shown), numeral 2 a belt arranged on the carcass 1 outward in the radial direction of the tire and comprised of four belt layers in the illustrated embodiment. Numeral 3 is a tread arranged on the belt 2 outward in the radial direction and provided with plural circumferential grooves 3a and island portions 3b defined by these circumferential grooves 3a. Further, numeral 4 is a foamed rubber layer. In the illustrated embodiment, the foamed rubber layer 4 is arranged in a zone corresponding to not more than 50% of a groove depth h in the circumferential groove 3a of the tread 3 to envelop the end portion of the belt 2.

As a result of vibration analysis during the running of the tire, it has been found that among noise produced from the tire, pattern noise is most dominant, but sound resulting from resonance of the sidewall portion becomes a large factor. In order to reduce such noise, it is advantageous to use a foamed rubber having fine bubbles therein for damping vibration from road surface. As a tire using such rubber, there is known a studless tire configured to improve running performance on snow and ice roads in winter season. However, when the foamed rubber used in the studless tire is merely applied to a tread in tires running on general-purpose road surfaces, the wear resistance is considerably poor when compared with the usual tire, so that it is difficult to put the tire comprising a tread of the foamed rubber for running on usual roads into practical use.

Figure 2:
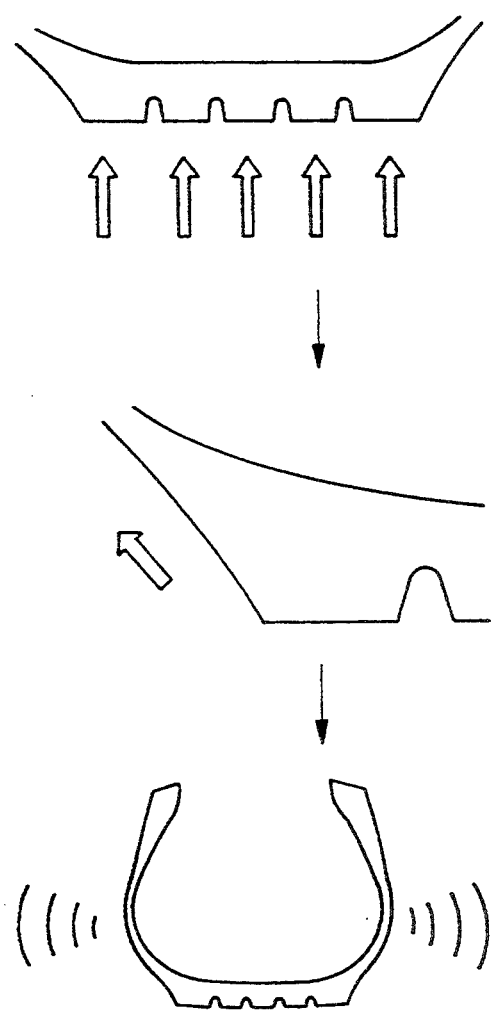
FIG. 2 is a schematic view illustrating a state of generating noise at a sidewall portion of the tire.

According to the invention, vibrations in the sidewall portion based on a noise generation mechanism as shown in FIG. 2 are damped by the foamed rubber layer 4 arranged in a zone ranging from a base portion of the tread to shoulder and buttress portions, whereby resonance sound in the sidewall portion can effectively be mitigated without degrading the wear resistance.

In the invention, the reason why the foamed rubber layer 4 is preferably arranged in the zone corresponding to not more than 50% of the groove depth h in the circumferential groove 3a of the tread 3 is due to the fact that when the position of the foamed rubber layer 4 exceeds 50% of the groove depth h, the foamed rubber layer 4 is exposed before a middle worn stage of the tread rubber to undesirably degrade the wear resistance from the middle worn stage. According to the invention, therefore, the position of the foamed rubber layer 4 is restricted to the zone corresponding to not more than 50% of the groove depth h of the circumferential groove 3a. Moreover, the foamed rubber layer 4 is preferably arranged in a zone from the shoulder portion to buttress portion, i.e. it is arranged in the shoulder island portion defined by the circumferential groove 3a to envelop the end portion of the belt 2 from the base portion of the tread. It is more effective that the end portion of the foamed rubber layer 4 is located inward from the end portion of the belt in the widthwise direction of the tire.

Furthermore, the expansion ratio of the foamed rubber is restricted to a range of 5–50%. When the expansion ratio is less than 5%, the effect of damping vibration can not be obtained. When it exceeds 50%, the rigidity becomes too small and hence the dynamic strain during the running under a load becomes large to undesirably degrade the wear resistance. Moreover, the expansion ratio is represented by the following equation:

$$V(\%) = (\Sigma 0/-1) \times 100$$

wherein V is an expansion ratio, $\Sigma 0$ (g/cm$^3$) is a density of solid phase portion of the foamed rubber and $\Sigma 1$ (g/cm$^3$) is a density of the foamed rubber.

Figure 3:
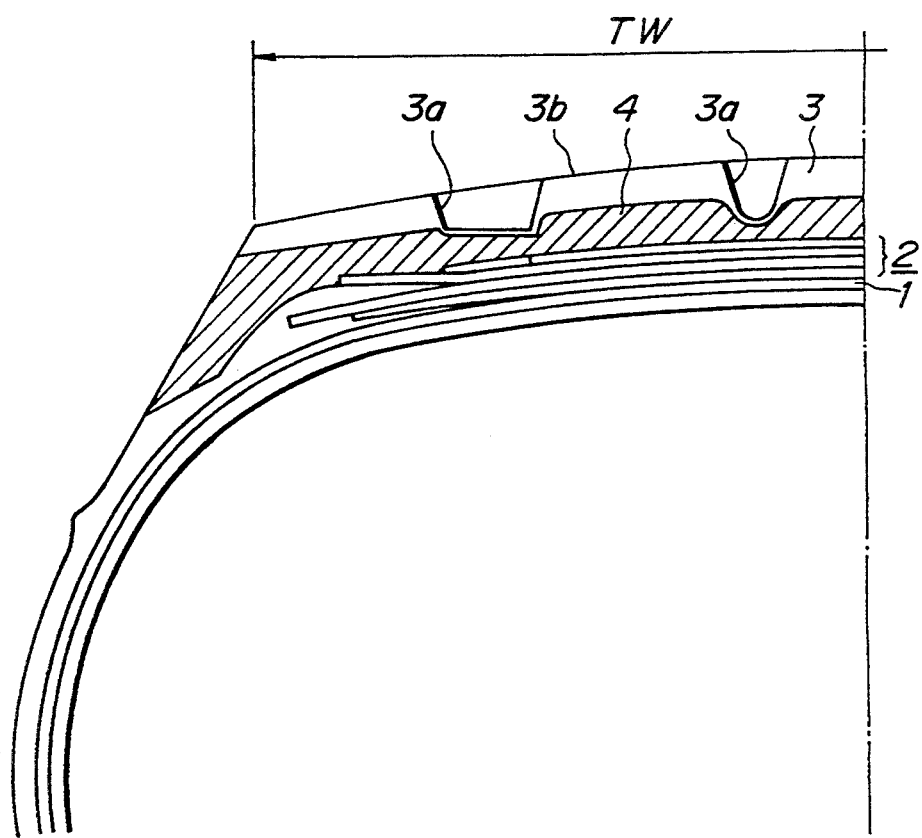
FIGS. 3 to 5 are diagrammatically left-half sectional views of the other embodiments of the pneumatic tire according to the invention, respectively.

In the invention, the foamed rubber layer 4 may be arranged over a full length of the tread 3 in the widthwise direction thereof as shown in FIG. 3. However, the central region of the tread 3 in the widthwise direction is large in the dynamic strain during running under a load and small in the effect of damping the transmission of vibration from the tread 3 to the sidewall portion. Hence it is most preferable to arrange the foamed rubber layer 4 in a zone ranging from the shoulder portion of the tread to the buttress portion thereof as shown in FIG. 1.

Figure 4:
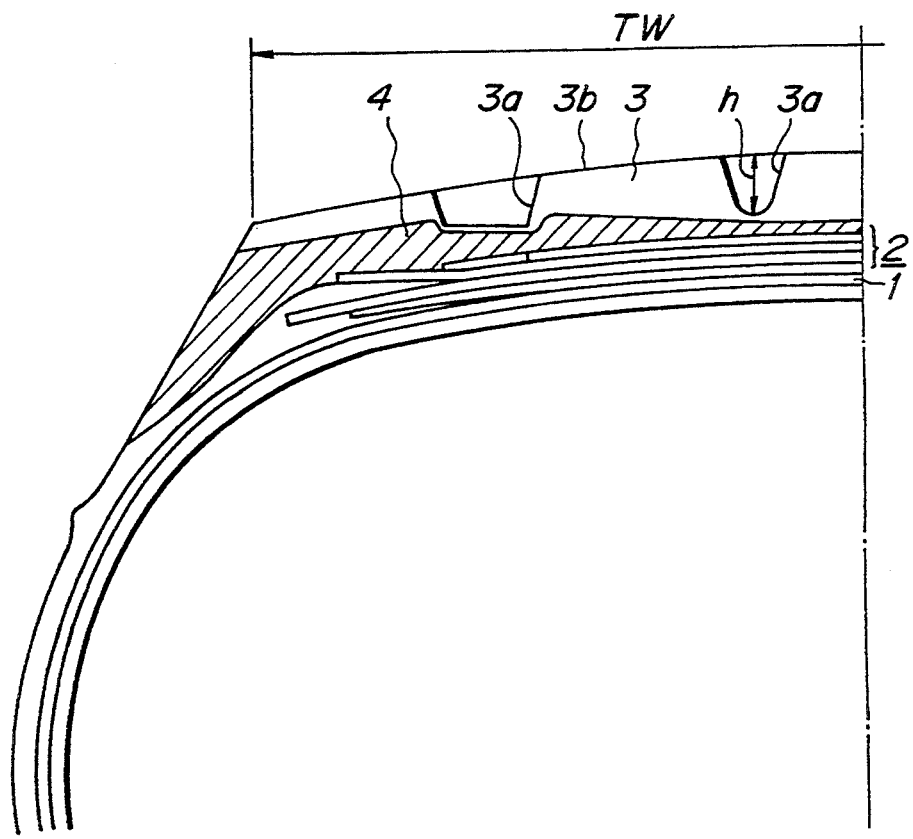

When the foamed rubber layer 4 is arranged over the full length of the tread 3 in the widthwise direction, it is favorable to the thickness of the foamed rubber layer 4 in the central region of the tread 3 as shown in FIG. 4.

Figure 5:
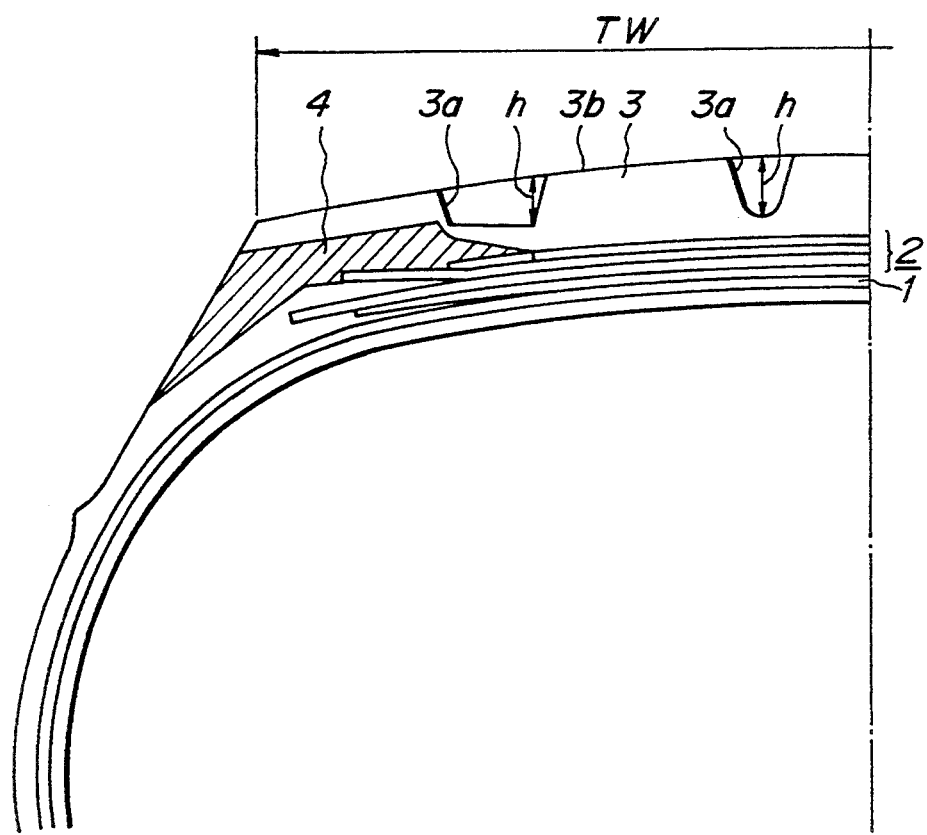

Moreover, the foamed rubber layer 4 may be exposed from the outer surface of the tire at the buttress portion as shown in FIG. 5. In this case, the foamed rubber may be degraded by ultraviolet ray or ozone. Therefore, the same rubber as used in the sidewall portion is preferably arranged on the buttress portion so as not to expose the foamed rubber from the surface of the tire from a view point of the prevention of the degradation by ultraviolet ray or ozone as shown in FIG. 1.

The following examples are given in illustration of the invention and are not intended as limitations thereof.

There were provided four test tires having a tire size of 11R22.5 14PR and the same tread pattern, in which the foamed rubber layer 4 having an expansion ratio of 18% was arranged as shown in FIGS. 1, 3, 4 and 5, respectively. These tires were mounted on a nominal rim and then noise and wear tests were made by running under a nominal internal pressure of 7.00 kgf/cm$^2$ and a nominal load of 2500 kgf. The measured results are shown in Table 1 together with the measured results of a comparative tire having the same structure as in the test tire except that the tread was made from usual rubber without using the foamed rubber. Each of these test tires comprised a radial carcass of single steel cord ply extending between a pair of bead cores and a belt of four steel cord belt layers, and had a rib tread pattern provided with four circumferential grooves and five continuously extending circumferential island portions defined by these grooves.

The noise test was conducted by an indoor noise test (drum having an outer diameter of 3 m) in which a microphone was placed at a position separated from the tire by 50 cm to measure sound. A sound pressure near to 500 Hz being a resonance sound of the sidewall portion was determined from the measured value in accordance with a relation between frequency and sound pressure, whereby noise was represented by an index on the basis that the comparative tire was 0. The smaller the index value, the smaller the noise. The wear test was conducted by actually mounting the tire on a vehicle and running over a distance of 50,000 km to measure a worn amount. The worn amount was represented by an index on the basis that the comparative tire was 100. The larger the index value, the better the wear resistance.

TABLE 1

|  | Acceptable Example (FIG. 1) | Acceptable Example (FIG. 3) | Acceptable Example (FIG. 4) | Acceptable Example (FIG. 5) | Comparative tire |
|---|---|---|---|---|---|
| Noise | −0.8 | −1.1 | −1.0 | −0.8 | 0 |
| Wear | 100 | 94 | 96 | 100 | 100 |

AS seen from Table 1, all tires according to the invention are small in the noise and do not show the considerable degradation of wear resistance.

In FIG. 6 is shown a relation between sound pressure and frequency in the comparative tire and the tire having structure of FIG. 1 according to the invention. As seen from FIG. 6, the sound pressure near to 500 Hz as a resonance sound of the sidewall portion in the tire according to the invention is mitigated by about 1 dB as compared with that of the comparative tire.

Although the invention is not limited to the above embodiments, various modifications may be made. For example, lug pattern, rib-lug pattern or block patterns may be used as a tread pattern, or organic fiber cord ply may be used as a carcass ply and the same organic fiber cord ply nay be used as a belt layer.

As mentioned above, according to the invention, the noises during the running of the tire, particularly noise resulted from the resonance of the sidewall portion can be reduced without degrading the wear resistance.

What is claimed is:

1. A heavy duty pneumatic tire comprising: a carcass having at least one carcass ply extending between a pair of bead cores, a belt superimposed around a crown portion of the carcass radially outwardly thereof and comprised of at least three belt layers, and a tread arranged on the belt radially outwardly and provided with plural circumferential grooves and land portions defined by said circumferential grooves, said tread being comprised of at least two rubber layers, one of said rubber layers comprising a foamed rubber layer not exposed at a ground contact surface of the tire, said foamed rubber layer being arranged in a buttress portion of the tire so as to extend radially inwardly from an end portion of the belt and extend continuously in the circumferential direction and positioned so as not to be exposed in the buttress portion at an outer side surface of the tire.

2. The heavy duty pneumatic tire of claim 1, wherein said foamed rubber layer is positioned in a zone corresponding to not more than 50% of a depth of said circumferential grooves.

3. The heavy duty pneumatic tire according to claim 1, wherein said foamed rubber has an expansion ratio of 5-50%.

4. The heavy duty pneumatic tire according to claim 1, wherein said foamed rubber layer is arranged only in a zone ranging from the shoulder portion of the tire to the buttress portion thereof.

5. The heavy duty pneumatic tire according to claim 1, wherein said foamed rubber layer is arranged over a full width of the tread.

6. The heavy duty pneumatic tire according to claim 5, wherein a thickness of said foamed rubber layer is thinner in a central portion of the tread in the widthwise direction as compared to a thickness in said buttress portion.

7. The heavy duty pneumatic tire of claim 5, wherein said foamed rubber layer has a surface contour to match a groove wall pattern of said circumferential grooves.

8. The heavy duty pneumatic tire of claim 7, wherein said foamed rubber layer has a surface contour to match said pattern of land portions.

9. The heavy duty pneumatic tire according to claim 1, wherein the carcass has a radial structure.

* * * * *